(12) United States Patent
Wei

(10) Patent No.: US 10,989,892 B2
(45) Date of Patent: Apr. 27, 2021

(54) LENS MODULE

(71) Applicant: AAC Technologies Pte. Ltd., Singapore (SG)

(72) Inventor: Chuandong Wei, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 143 days.

(21) Appl. No.: 16/529,803

(22) Filed: Aug. 2, 2019

(65) Prior Publication Data

US 2020/0049933 A1 Feb. 13, 2020

(30) Foreign Application Priority Data

Aug. 10, 2018 (CN) .......................... 201821294717.1

(51) Int. Cl.
*G02B 27/00* (2006.01)
*G02B 7/02* (2021.01)

(52) U.S. Cl.
CPC ............. *G02B 7/025* (2013.01); *G02B 7/022* (2013.01)

(58) Field of Classification Search
CPC ................................ G02B 7/025; G02B 7/022
USPC ........................................................... 359/829
See application file for complete search history.

(56) References Cited

U.S. PATENT DOCUMENTS

2019/0182478 A1* 6/2019 Chen ...................... G02B 7/022

* cited by examiner

*Primary Examiner* — James C. Jones
(74) *Attorney, Agent, or Firm* — W&G Law Group LLP

(57) ABSTRACT

The present disclosure relates to the field of optical lenses, and provides a lens module. The lens module includes a lens barrel, a lens disposed at an object side of the lens barrel, and a fixing part for pressing the lens against the lens barrel from an object side of the lens. The fixing part includes an inner wall surface enclosing a receiving space, in which the lens and an end of the lens barrel adjacent to an object side are received. The inner wall surface includes an abutting portion abutting against the lens, and a non-abutting portion spaced apart from the lens. Glue is filled between the abutting portion and the lens. The lens module provided by the present disclosure has a relatively higher reliability.

7 Claims, 2 Drawing Sheets

LENS MODULE

TECHNICAL FIELD

The present disclosure relates to the technical field of optical lenses, and in particular, to a lens module for a vehicle system.

BACKGROUND

In recent years, with development of technologies, a lens module is becoming smaller and smaller. In addition to electronic devices such as digital cameras, tablet computers, cellphones, etc., vehicles are also equipped with lens modules, which are referred to as vehicle-mounted lens module. The vehicle-mounted lens module generally includes a lens barrel, a lens, and other components.

The inventors have found the following problems in the prior art: the vehicle-mounted lens module, when subjected to external forces caused by vibration, friction, and collision, has a poor reliability. Therefore, it is urgent to improve the reliability of the vehicle-mounted lens module.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

Figure 1:
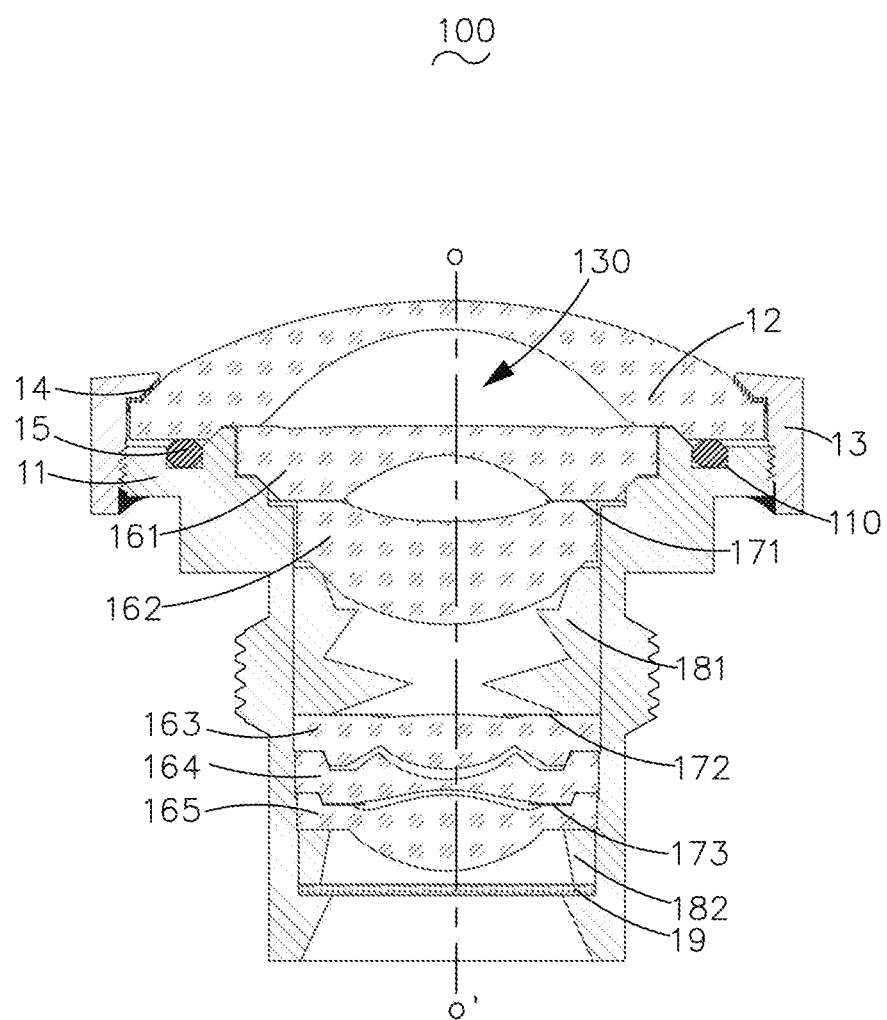
FIG. 1 is a structural schematic cross-sectional view of a lens module according to an embodiment of the present disclosure.
Figure 2:
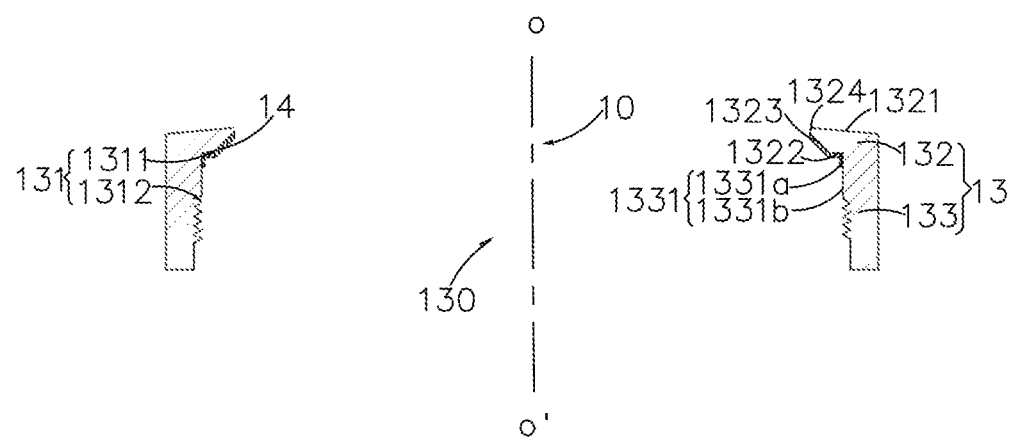
FIG. 2 is a structural schematic cross-sectional view of a fixing part of a lens module according to an embodiment of the present disclosure.

An embodiment of the present disclosure provides a lens module 100. As shown in FIG. 1 and FIG. 2, the lens module 100 includes a lens barrel 11, a lens 12 arranged at an object side of the lens barrel 11, and a fixing part 13 for pressing the lens 12 against the lens barrel 11 from an object side of the lens 12. The fixing part 13 includes an inner wall surface 131 enclosing a receiving space 130, and the receiving space 130 receives the lens 12 and an end of the lens barrel 11 adjacent to the object side. The inner wall surface 131 includes an abutting portion 1311 abutting against the lens 12, and a non-abutting portion 1312 spaced apart from the lens 12. Glue 14 is filled between the abutting portion 1311 and the lens 12.

Compared with the related art, in this embodiment of the present disclosure, the lens 12 is pressed against and held on the lens barrel 11 from the object side of the lens 12 by the fixing part 13, so that the lens 12 is fixed to the lens barrel 11. Meanwhile, the glue 14 is filled between the lens 12 and the abutting portion 1311 of the fixing part 13 that abuts against the lens 12, so that the lens 12 can be bond to the fixing part 13 by means of the glue 14, and the lens 12 can be fixed to the fixing part 13 in a more reliable manner, thereby improving the reliability of the overall lens module 100. Moreover, the glue 14 filled between the lens 12 and the abutting portion 1311 can improve the sealing between the lens 12 and the lens barrel 11 of the lens module 100, so as to prevent external debris (such as water, or dust) from entering the receiving space 130 and then entering the lens barrel 11 and to avoid their influence on performances of optical components received in the lens barrel 11.

The lens module provided by the present embodiment is described in details as follows. However, it should be noted that the following description is merely illustrative, but not intended to limit the present disclosure.

Specifically, the fixing part 13 includes a pressing wall 132 pressing the lens 12 from the object side of the lens 12 and defining a light through hole 10, and an extending wall 133 extending from the pressing wall 132 while being bent towards the image side. The pressing wall 132 includes an object side surface 1321 close to the object side, an image side surface 1322 close to the image side, and a hole-wall surface 1323 located between the object side surface 1321 and the image side surface 1322 and enclosing the light through hole 10. The extending wall 133 includes a side wall surface 1331 connected to the image side surface 1322 and facing the receiving space 130. The hole-wall surface 1323, the image side surface 1322, and the side wall surface 1331 together enclose the receiving space 130. The fixing part 13 is provided with the structures of the pressing wall 132 and the extending wall 133, in order to help the pressing wall 132 to press the lens 12 against the lens barrel 11 from the object side of the lens 12 and thus to fix the lens at the object side of the lens 12. Meanwhile, since the hole-wall surface 1323, the image side surface 1322, and the side wall surface 1331 together enclose the receiving space 130, the fixing part 13 can easily receive the lens 12 and the lens barrel 11, such that the fixing part 13 can fix the lens 12 and the lens barrel 11 in an easier way.

Further, the side wall surface 1331 includes a first surface 1331a close to the object side and connected to the object side surface 1321, and a second surface 1331b located at an image side of the first surface 1331a. The abutting portion 1311 includes at least one of the first surface 1331a, the image side surface 1322, and the hole-wall surface 1323. It should be understood that in this embodiment, in order to increase a bonding area between the lens 12 and the fixing part 13 and form a more reliable fixation between the lens 12 and the fixing part 13, the abutting portion 1311 may include all of the first surface 1331a, the image side surface 1322, and the hole-wall surface 1323. In another embodiment of the present disclosure, in order to reduce an amount of glue 14 and cost, the abutting portion 1311 may include only one or two of the first surface 1331a, the image side surface 1322, and the hole-wall surface 1323. Specific choices can be made in accordance with the actual needs, which is limited herein by the embodiments.

Furthermore, the non-abutting portion 1312 includes at least the second surface 1331b. According to the above description, when the abutting portion 1311 includes only one or two of the first surface 1331a, the image side surface 1322, and the hole-wall surface 1323, the non-abutting portion 1312 includes the surface that is not included in the abutting portion 1311. Meanwhile, the second surface 1331b is a non-abutting portion 1312. When the glue 14 filled between the abutting portion 1311 and the lens 12 can reliably fix the lens 12 to the fixing part 13 and ensure the sealing between the fixing part 13 and the lens 12, without filling the glue 14 between the second surface 1331b and the lens 12, the amount of glue 14 and thus the cost are reduced.

Preferably, the fixing part 13 is a thread cap. The side wall surface 1331 further includes an internal thread provided on the second surface 1331b, and a rim of an end of the lens barrel 11 close to the image side is provided with an external thread. The lens barrel 12 is fixed to the side wall surface 1331 by matching the external thread with the internal thread. It should be understood that, in another embodiment of the present disclosure, the side wall surface 1331 and the lens barrel 11 can be fitted in other manners to establish the fixation between the lens barrel and the fixing part. For example, the lens barrel 11 is provided with a protrusion and the side wall surface 1331 is provided with a recess, and the protrusion is inserted into the recess. Any manner, through which the side wall surface 1331 can be fixed to the lens barrel 11, shall fall within the scope of the present disclosure.

It should be noted that the pressing wall 132 further includes an arc surface 1324 connecting the object side surface 1321 with the hole-wall surface 1323. Compared with the case in which the object side surface 1321 the hole-wall surface 1323 are directly connected and form a sharp tip, by providing the arc surface 1324 between the object side surface 1321 and the hole-wall surface 1323, the lens 12 can be protected from being scratched by the sharp tip during assembling the lens module 100.

It should be noted that a sealing ring 15 can be arranged between the image side of the lens 12 and the object side of the lens barrel 11. In addition to increasing the sealing of the lens module 100 with the glue 14 filled between the lens barrel 11 and the lens 12, the sealing ring 15 can further prevent the external debris (such as water, or dust) from entering the receiving space 130 and then entering the lens barrel 11, thereby avoiding their influence on performances of optical components received in the lens barrel 11.

In this embodiment, the lens barrel 11 is provided with a groove 110, in which the sealing ring 15 is received. Compared with a case where the sealing ring is arranged on a planar surface, the groove 110 can receive some external debris, so as to provide a better block for the external debris and thus better prevent the debris from entering the lens barrel 11. In this way, the debris cannot affect the performances of optical components received in the lens barrel 11.

It should be noted that the groove 110 has an annular shape surrounding an optical axis OO' of the lens 12. The sealing ring 15 can be better fitted in the annular recess 110, so as to prevent external debris from entering the lens barrel 11 from any direction.

In addition, in this embodiment, the lens module 100 further includes a lens 161, a lens 162, a lens 163, a lens 164, and a lens 165 that are received in the lens barrel 11 and located at the image side of the lens 12. A first light-blocking sheet 171 is arranged between the lens 161 and the lens 162. A first gasket 181 and a second light-blocking sheet 172 are arranged between the lens 162 and the lens 163. The first gasket 181 is located at an object side of the second light-blocking sheet 172. A third light-blocking sheet 173 is arranged between the lens 164 and the lens 165. A second gasket 182 and a light filter 19 are arranged at an image side of the lens 165, and the second gasket 182 is located at an object side of the light filter 19.

It should be understood by those skilled in the art that the above embodiments are merely some specific embodiments of the present disclosure, and various changes in form and details may be made without departing from the scope of the present disclosure.

What is claimed is:
1. A lens module, comprising:
a lens barrel;
a lens disposed at an object side of the lens barrel; and
a fixing part for pressing the lens against the lens barrel from an object side of the lens,
wherein the fixing part comprises an inner wall surface enclosing a receiving space, the lens and an end of the lens barrel close to the object side being received in the receiving space,
the inner wall surface comprises an abutting portion abutting against the lens and a non-abutting portion spaced apart from the lens, and glue is filled between the abutting portion and the lens.
2. The lens module according to claim 1, wherein the fixing part further comprises a pressing wall pressing the lens from the object side of the lens and defining a light through hole, and an extending wall extending from the pressing wall toward an image side while being bent towards an image side,
the pressing wall comprises an object side surface close to the object side, an image side surface close to the image side, and a hole-wall surface located between the object side surface and the image side surface and enclosing the light through hole,
the extending wall comprises a side wall surface connected to the image side surface and facing the receiving space, and
the hole-wall surface, the image side surface, and the side wall surface together enclose the receiving space.
3. The lens module according to claim 2, wherein the side wall surface comprises a first surface close to the object side and connected to the object side surface, and a second surface located on a side of the first surface close to the image side,
the abutting portion comprises at least one of the first surface, the image side surface, and the hole-wall surface.
4. The lens module according to claim 3, wherein the non-abutting portion comprises at least the second surface.
5. The lens module according to claim 3, wherein the fixing part is a thread cap, the side wall surface further comprises an internal thread provided on the second surface, an outer periphery of the lens barrel close to the image side is provided with an external thread, and the lens barrel and the side wall surface are fixed by matching the external thread with the internal thread.
6. The lens module according to claim 2, wherein the pressing wall further comprises an arc surface connecting the object side surface with the hole-wall surface.
7. The lens module according to claim 1, wherein a sealing ring is sandwiched between an image side of the lens and the object side of the lens barrel.

* * * * *